July 29, 1952  A. HOROWITZ ET AL  2,604,670

FACTORY BUILDING

Filed Jan. 26, 1949

INVENTORS:
ALEXANDRE HOROWITZ AND
HENDRIK KOEKEBAKKER
BY

Patented July 29, 1952

2,604,670

UNITED STATES PATENT OFFICE 2,604,670

FACTORY BUILDING

Alexandre Horowitz and Hendrik Koekebakker, Amersfoort, Netherlands

Application January 26, 1949, Serial No. 72,846
In the Netherlands February 5, 1948

1 Claim. (Cl. 20—1)

This invention relates to a factory building, shed or similar building structure of substantially rectangular shape with a central sky light extending throughout the whole or practically the whole length of the building.

In factory buildings of the above mentioned kind the machines and tool-units are generally placed in the middle part of the building beneath the sky light, whereas the office- and store-rooms are arranged upon bases or raised parts on either side thereof, i. e. along the outer walls of the building. This is attended with various drawbacks. In the first place a considerable dead space is formed immediately beneath the sky light which is useless and very detrimental to the heating of the building. Moreover the lighting of the centrally disposed machines is greatly impeded by the surrounding office- and store-rooms. Furthermore the traffic in the factory is inconvenient, since it has to take place between the office rooms and the machine-units. Finally the executive staff cannot obtain a good survey over the whole factory from the office rooms.

An object of the present invention is to eliminate these drawbacks and to provide a building in which the available space is utilised as completely as possible, thereby realising a reasonable division of the space and a good location of the machinery.

According to the invention this is attained by providing under the sky light in the building a story including offices and having side walls made substantially of transparent or translucent material. In this way all office rooms, working rooms for the administrative and higher staff, washing and dining localities, water closets and, if desired, also the storage rooms can be removed from the factory room proper and can be arranged in the said story beneath the sky light. The factory room is illuminated, not only by the windows in the side walls of the building, but also from above by the above-mentioned transparent or translucent side walls, so that a convenient and effective lighting is assured. Moreover, from this story a good survey over the whole factory room is obtained.

A further object of the invention is to provide the side walls of the said story with a salient angle in cross section, the angular point of which is situated in the roof plane of the building.

A still further object of the invention is to execute the story beneath the sky light as an overhanging structure extending beyond one or both end walls of the building, so as to obtain a building of beautiful appearance.

Still further objects, features and details of the present invention will become evident from the following description with reference to the accompanying drawings in which—

Figure 1:
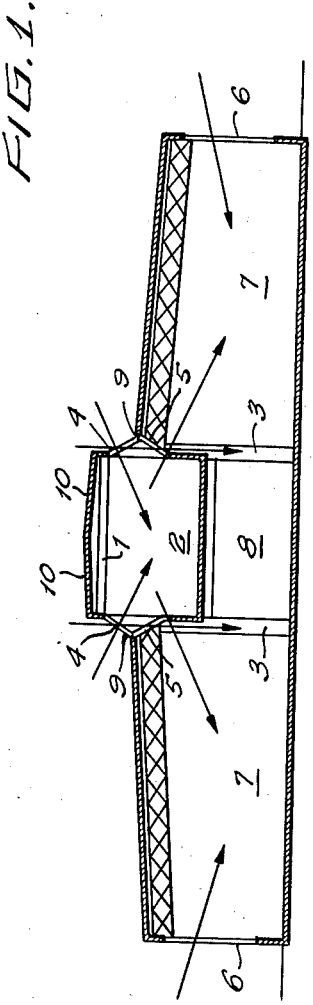
Fig. 1 is a diagrammatic cross section of an embodiment of a factory building according to the invention.

In the embodiment shown in Fig. 1 under the usual central sky light 1 of the factory building a story 2 is formed which is e. g. supported by spaced columns 3. This story 2 is accessible by one or more stairs, not shown, either from the factory room or from the outside, and comprises as a rule the offices, working rooms for the administrative and higher staff, drawing apartments, as well as dining rooms, washing places, shower-bath cells, urinals and water closets and, if desired, also one or more storage rooms or depots. The side walls 4 and, if desired, also the roof of the sky light are substantially made of glass or a similar transparent or translucent material. This also applies to the walls 5 of the story 2 which presents a salient angle with the walls 4 and extend within the building. By this an excellent lighting of the factory room proper is assured, since this room is not only lighted by the windows in the side walls 6 of the building, but at the same time from above, as has been indicated by the arrows in Fig. 1. Moreover, from the story 2 a good survey over the machines in the factory room is possible, since the machines and tool-units are arranged in the spaces 7. These spaces 7 are separated by a traffic-passage 8 which is provided, if desired, with one or more stores or depots.

The salient angle of side walls 4, 5 has the angular point 9 thereof situated in the roof plane of the building. In this way a direct lighting of the factory room and a superior survey thereof is obtained. The roof of the sky light story may be flat, but may be executed also in the shape of a saddle 10—10.

Figure 2:
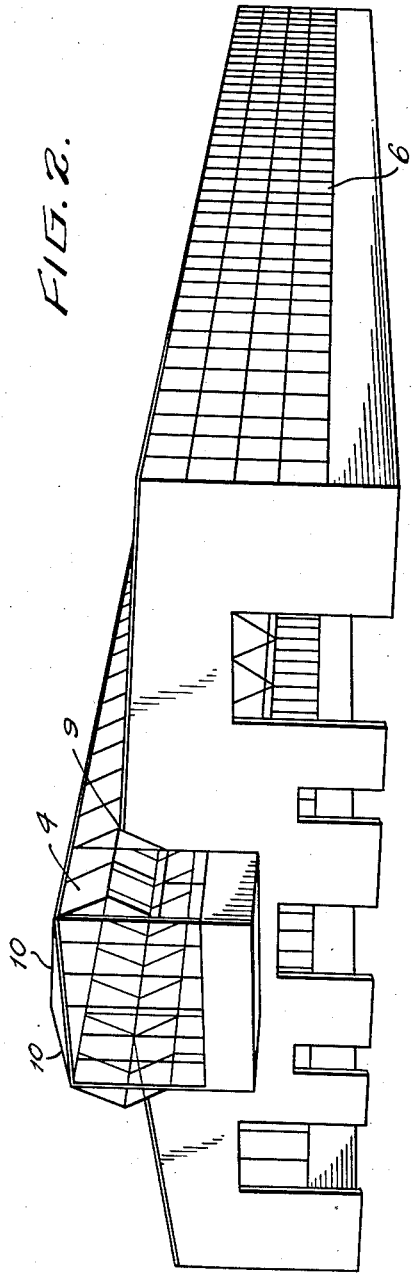
Fig. 2 shows, in a perspective view, the embodiment of Fig. 1 which is provided with an overhanging sky light story.

Fig. 2 shows the sky light story of Fig. 1 which is executed as an overhanging structure extending beyond the end walls of the building, by which a beautiful architectonic appearance of the building is obtained.

What we claim is:

In a building, in combination, a roof having two side portions and a central portion, said side portions each having inner edges, and said central portion being located at a substantial distance above said side portions, said central portion of said roof having outer edges which are located inwardly of said inner edges of said side portions of said roof; a floor having outer edges and being supported in said building under said central portion and at a substantial distance below said inner edges of said side portions of said roof so as to provide a space between said outer edges of said floor and said roof, and said floor being supported at a substantial distance above the lowermost part of said building, said outer edges of said floor also being located inwardly of said inner edges of said side roof portions, whereby a pair of substantially vertical spaces are provided between said inner edges of said side roof portions and said outer edges of said central portion and floor; substantially transparent inclined wall means interconnecting said central roof portion with said side roof portions, whereby the light entering said building through said transparent wall means between said central and side roof portions passes through said space between the outer edges of said floor and said roof and into the interior of said building and whereby a view of almost the entire interior of the building is afforded through said space; and additional substantially transparent wall means interconnecting said floor and said inner edges of said side portions of said roof, said additional transparent wall means being inclined in a direction opposite to the inclination of said first mentioned transparent wall means.

ALEXANDRE HOROWITZ.
HENDRIK KOEKEBAKKER.

REFERENCES CITED

The following references are of record in the file of this patent:

UNITED STATES PATENTS

| Number | Name | Date |
|---|---|---|
| 334,694 | De Lemos et al. | Jan. 19, 1886 |
| 870,917 | Weston | Nov. 12, 1907 |
| 1,309,867 | Morehouse | July 15, 1919 |

FOREIGN PATENTS

| Number | Country | Date |
|---|---|---|
| 41,025 | France | 1932 |

OTHER REFERENCES

Steel Mill Building, McGraw-Hill Book Co., page 194, 3rd ed.

Mill Buildings, Tyrrell (1911), page 67.